US008767157B2

(12) United States Patent
Choi

(10) Patent No.: US 8,767,157 B2
(45) Date of Patent: Jul. 1, 2014

(54) LIQUID CRYSTAL DISPLAY AND METHOD OF MANUFACTURING THE SAME

(75) Inventor: Hyuck Choi, Gumi-si (KR)

(73) Assignee: LG Display Co. Ltd., Seoul (KR)

( * ) Notice: Subject to any disclaimer, the term of this patent is extended or adjusted under 35 U.S.C. 154(b) by 376 days.

(21) Appl. No.: 12/626,284

(22) Filed: Nov. 25, 2009

(65) Prior Publication Data

US 2010/0149479 A1   Jun. 17, 2010

(30) Foreign Application Priority Data

Dec. 12, 2008   (KR) ........................ 10-2008-0126688

(51) Int. Cl.
G02F 1/1343  (2006.01)

(52) U.S. Cl.
USPC .......................................... 349/141; 349/144

(58) Field of Classification Search
USPC .......................................... 349/144, 141, 139
See application file for complete search history.

(56) References Cited

U.S. PATENT DOCUMENTS

| | | | | |
|---|---|---|---|---|
| 6,459,464 B1 * | 10/2002 | Nakasima et al. | ............ | 349/141 |
| 7,623,191 B2 * | 11/2009 | Liao et al. | ....................... | 349/40 |
| 7,683,998 B2 * | 3/2010 | Lee | ................................ | 349/141 |
| 7,884,912 B2 * | 2/2011 | Seok et al. | .................... | 349/141 |
| 2006/0001815 A1 * | 1/2006 | Kim et al. | ...................... | 349/141 |
| 2007/0002245 A1 * | 1/2007 | Lee et al. | ....................... | 349/141 |
| 2007/0216841 A1 * | 9/2007 | Konno | ........................... | 349/141 |
| 2007/0229749 A1 * | 10/2007 | Kaneko et al. | ................ | 349/141 |
| 2008/0002079 A1 * | 1/2008 | Kimura | ........................... | 349/42 |

* cited by examiner

*Primary Examiner* — Mark Robinson
*Assistant Examiner* — Robert Tavlykaev
(74) *Attorney, Agent, or Firm* — Brinks Gilson & Lione

(57) ABSTRACT

A liquid crystal display comprises a liquid crystal panel including subpixels formed in a matrix, each of the subpixels comprising: a first area, a second area, and a third area partitioned off in a long-axis direction; a first pixel electrode arranged in the long-axis direction of the first area; second pixel electrodes extending from the first pixel electrode in a central area of the long-axis direction and arranged in the first to third areas; third pixel electrodes extending from the first pixel electrode, divided into third pixel electrodes on one side and third pixel electrodes on the other side with respect to the second pixel electrodes, and arranged in plural number in the first to third areas, the slope of the electrodes arranged in the first and third areas being steeper than the slope of the electrodes arranged in the second area with respect to a virtual horizontal line passing through the central area; a first common electrode disposed on the same layer as the first to third pixel electrodes and arranged in the long-axis direction of the third area; a second common electrode extending from the first common electrode in the central area and arranged between the second pixel electrodes; and third common electrodes extending from the first common electrode, divided into third common electrodes on one side and third common electrodes on the other side with respect to the second pixel electrodes, arranged in plural number in the first to third areas, and having the same slope as the third pixel electrodes.

18 Claims, 5 Drawing Sheets

LIQUID CRYSTAL DISPLAY AND METHOD OF MANUFACTURING THE SAME

This application claims the benefit of Korea Patent Application No. 10-2008-01266688, filed on Dec. 12, 2008, the entire contents of which is incorporated herein by reference for all purposes as if fully set forth herein.

BACKGROUND

1. Field of the Invention

The present invention relates to a liquid crystal display and a method of manufacturing the same.

2. Discussion of the Related Art

As a result of the ongoing development of information technology, the market for display devices which connect users and information is expanding. The use of flat panel displays (FPDs) such as liquid crystal displays (LCDs), organic light emitting diode (OLED) displays, and a plasma display panels (PDPs), is increasing. LCDs, in particular, which can provide high resolution, be miniaturized, and have a large screen size, are widely used.

LCDs are classified as light-receiving display devices because they display an image using light received from a backlight unit disposed below a liquid crystal panel. The liquid crystal panel includes a color filter substrate and a thin film transistor array substrate. The color filter substrate has a color filter formed corresponding to each pixel region on one surface of a transparent substrate, and the thin film transistor array substrate has a thin film transistor including a gate, a semiconductor layer, a source, and a drain disposed at each subpixel. Here, the source or drain of the thin film transistor disposed at each subpixel is connected to a pixel electrode. Further, a common electrode, along with the pixel electrode, is disposed at each subpixel so as to control an arrangement of liquid crystal. The common electrode is selectively disposed on the color filter substrate or the thin film transistor array substrate according to a driving mode.

An in-plane switching (IPS) mode LCD is configured such that a pixel electrode and a common electrode are formed on a thin film transistor array substrate, and an arrangement of liquid crystal is adjusted by a transverse electric field generated between the two electrodes. However, the LCD that operates in the IPS mode has a problem in that when an external force is applied to the liquid crystal panel, blurring (or fingerprint smudges) remains on the subpixels due to liquid crystal disclination. A solution to this problem is required.

BRIEF SUMMARY

According to one aspect, a liquid crystal display includes a liquid crystal panel including subpixels formed in a matrix. Each of the subpixels includes: a first area, a second area and a third area partitioned off in a long-axis direction; a first pixel electrode arranged in the long-axis direction of the first area; second pixel electrodes extending from the first pixel electrode in a central area of the long-axis direction and arranged in the first to third areas; third pixel electrodes extending from the first pixel electrode, divided into third pixel electrodes on one side and third pixel electrodes on the other side with respect to the second pixel electrodes, and arranged in plural number in the first to third areas, the slope of the electrodes arranged in the first and third areas being steeper than the slope of the electrodes arranged in the second area with respect to a virtual horizontal line passing through the central area; a first common electrode disposed on the same layer as the first to third pixel electrodes and arranged in the long-axis direction of the third area; a second common electrode extending from the first common electrode in the central area and arranged between the second pixel electrodes; and third common electrodes extending from the first common electrode, divided into third common electrodes on one side and third common electrodes on the other side with respect to the second pixel electrodes, arranged in plural number in the first to third areas, and having the same slope as the third pixel electrodes.

According to another aspect, a method of manufacturing a liquid crystal display includes: defining a subpixel area as a matrix and defining a first area, a second area, and a third area partitioned off in a long-axis direction of the subpixel; forming a first pixel electrode arranged in the long-axis direction of the first area, second pixel electrodes extending from the first pixel electrode in a central area of the long-axis direction and arranged in the first to third areas, and third pixel electrodes extending from the first pixel electrode, divided into third pixel electrodes on one side and third pixel electrodes on the other side with respect to the second pixel electrodes, and arranged in plural number in the first to third areas, the slope of the electrodes arranged in the first and third areas being steeper than the slope of the electrodes arranged in the second area with respect to a virtual horizontal line passing through the central area; and forming a first common electrode disposed on the same layer as the first to third pixel electrodes and arranged in the long-axis direction of the third area, a second common electrode extending from the first common electrode in the central area and arranged between the second pixel electrodes, and third common electrodes extending from the first common electrode, divided into third common electrodes on one side and third common electrodes on the other side with respect to the second pixel electrodes, arranged in plural number in the first to third areas, and having the same slope as the third pixel electrodes.

BRIEF DESCRIPTION OF THE DRAWINGS

The accompany drawings, which are included to provide a further understanding of the invention and are incorporated in and constitute a part of this specification, illustrate embodiments of the invention and together with the description serve to explain the principles of the invention.

DETAILED DESCRIPTION OF THE DRAWINGS AND THE PRESENTLY PREFERRED EMBODIMENTS

Exemplary embodiments of the present disclosure will now be described in detail with reference to the accompanying drawings.

Figure 1:
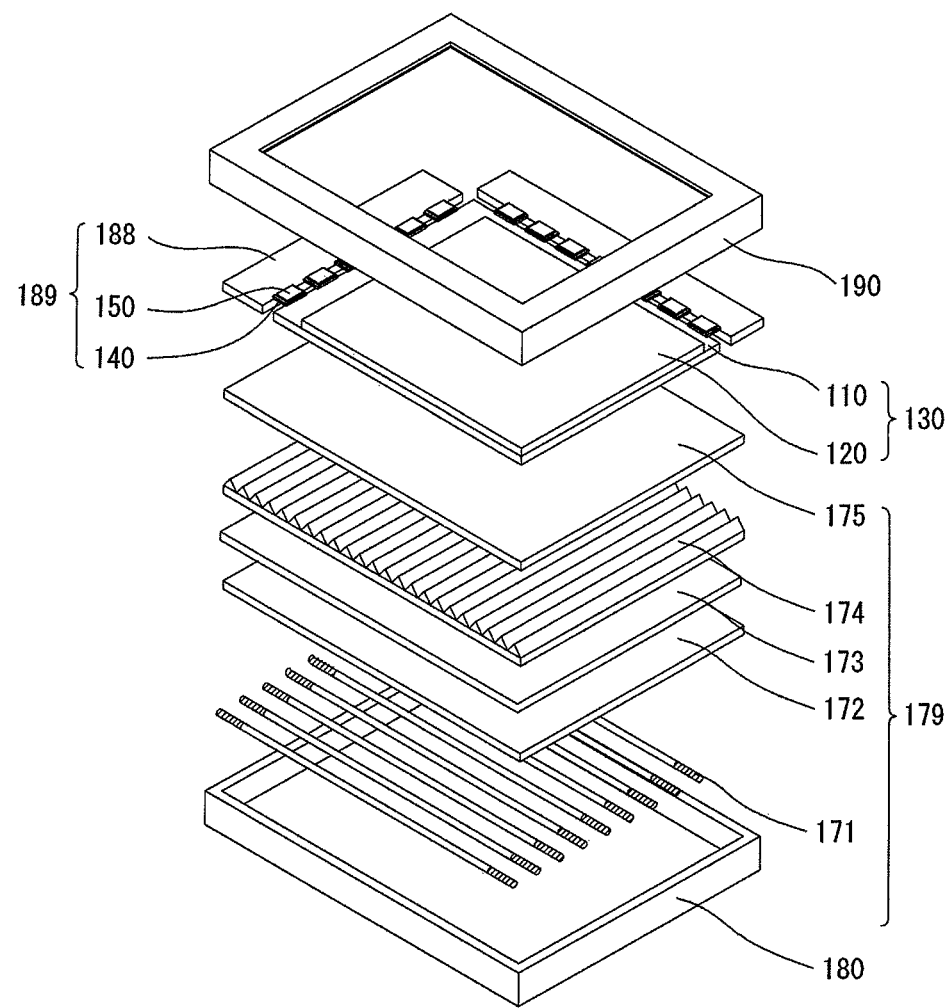
FIG. 1 is an exploded perspective view of a liquid crystal display.

As shown in FIG. 1, a liquid crystal display comprises a liquid crystal panel 130, a driver 189, and a backlight unit 179.

The liquid crystal panel 130 may have a structure in which a first substrate 110 on which a transistor array is formed and a second substrate 120 on which color filters are formed are joined together with a liquid crystal layer interposed therebetween. The liquid crystal layer may include liquid crystal molecules that are aligned in an in-plane switching (IPS) mode.

The liquid crystal panel 130 displays images by adjusting the transmittance of light in such a manner that subpixels driven independently by the transistors are arranged in a matrix form and the subpixels control the arrangement of liquid crystals according to a voltage difference between a common voltage supplied to a common electrode and a data signal supplied to a pixel electrode connected to the transistors.

The backlight unit 179 may comprise a bottom cover 180, a lamp 171, a diffusion plate 172, a diffusion sheet 173, an optical sheet 174, a protection sheet 175, and so on. Here, a cold cathode fluorescent lamp (CCFL), a hot cathode fluorescent lamp (HCFL), an external electrode fluorescent lamp (EEFL), a light emitting diode (LED), and the like may be used as the lamp 171, but the present invention is not limited thereto. Sheets such as a prism, a lenticular lens, or a microlens may be used as the optical sheet 174, but the present invention is not limited thereto.

The driver 189 may comprise a plurality of film circuits 140, each including a driving chip 150 mounted thereon to supply a driving signal to a data line and a gate line connected to the liquid crystal panel 130, and being connected to one side of the first substrate 110, and a printed circuit board 188 connected to the first substrate 110. Pad portions formed on the plurality of film circuits 140 are respectively connected to pad portions formed on the printed circuit board 188 and pad portions formed on the first substrate 110 in order to electrically connect the printed circuit board 188 and the first substrate 110. The film circuits 140 including the driving chip 150 mounted thereon may be a chip-on-film (COF) type or a tape carrier package (TCP) type. Alternatively, the driving chip 150 may be directly mounted on the first substrate 110 by chip-on-glass (COG) or may be mounted on the first substrate 110 during a process of forming the transistors.

The above-described liquid crystal panel 130 and backlight unit 179 for displaying images may be accommodated by a top cover 190 and the bottom cover 180. The top cover 190 may accommodate the liquid crystal panel 130, and the bottom cover 170 may accommodate the backlight unit 179. Meanwhile, the liquid crystal panel 130 may be disposed a predetermined spacing distance above the backlight unit 179. The liquid crystal panel 130 and the backlight unit 179 may be fixed and protected by the top cover 190, which is configured to be secured to the bottom cover 180. Here, an opening for exposing an image display area of the liquid crystal panel 130 may be provided on the top surface of the top cover 190.

The above-described liquid crystal panel 130 can display an image with each pixel according to a scan signal supplied through the gate lines and a data voltage supplied through the data lines. The scan signal may be a pulse signal in which a gate high voltage supplied during a horizontal period and a gate low voltage supplied during the remaining periods alternate, but the present invention is not limited thereto.

The transistors included in the subpixels are turned on when the gate high voltage is supplied from the gate lines, and can supply the data voltages, which are supplied from the data lines, to the liquid crystal layer. Accordingly, when the transistor of each pixel is turned on and the data voltage is therefore applied to the pixel electrode, the liquid crystal display can display an image as a voltage difference between the data voltage and the common voltage is charged in the liquid crystal layer.

On the contrary, if the gate low voltage is supplied from the gate lines, the transistor is turned off so that the data voltage charged into the liquid crystal layer can be sustained during 1 frame period by a storage capacitor. Meanwhile, the liquid crystal panel 130 can repeat different operations according to the scan signals supplied through the gate lines.

A subpixel included in the liquid crystal panel will now be described.

Figure 2:
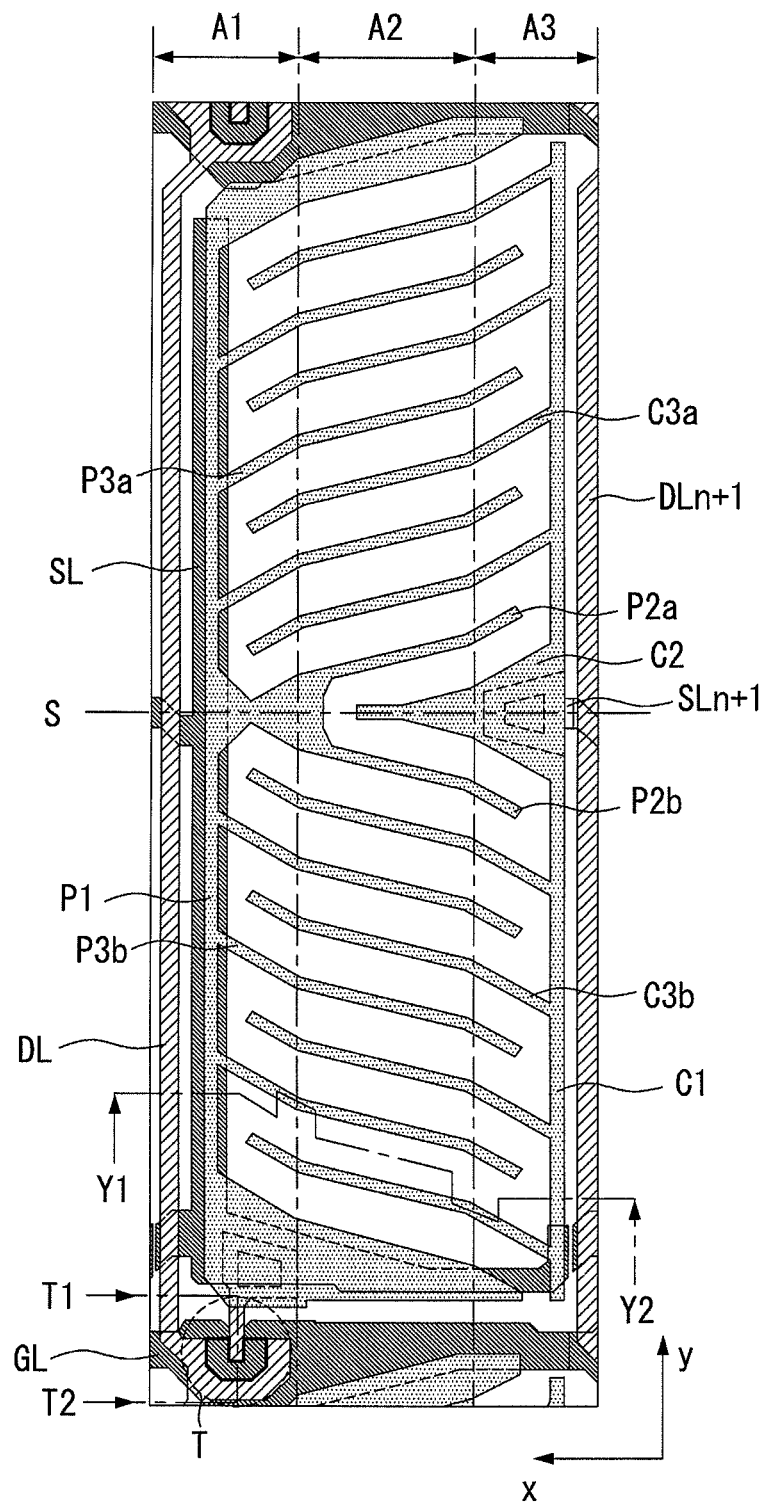
FIG. 2 is a plan view of a subpixel according to an exemplary embodiment.

Referring to FIG. 2, the subpixel is long in a long-axis direction (y) and short in a short-axis direction (x). In the subpixel, a first area A1, a second area A2, and a third area A3 partitioned off in the long-axis direction (y) are defined. The subpixel comprises a data line DL for supplying a data signal, a gate line GL for supplying a gate signal, and a common voltage line SL for supplying a common voltage. Further, the subpixel comprises a transistor T connected to the data line DL and the gate line GL, pixel electrodes P1, . . . , P3b connected to the source or drain of the transistor T, and common electrodes C1, . . . , C3b connected to the common voltage line SLn+1 disposed at a neighboring subpixel.

The pixel electrodes P1, . . . , P3b included in the subpixel comprise a first pixel electrode P1, second pixel electrodes P2a and P2b, and third pixel electrodes P3a and P3b. The common electrodes C1, . . . , C3b comprise a first common electrode C1, a second common electrode C2, and third common electrodes C3a and C3b.

The first pixel electrode P1 included in the pixel electrodes is arranged in the long-axis direction (y) of the first area A1. The second pixel electrodes P2a and P2b extend from the first pixel electrode P1 in the central area S of the long-axis direction (y) and are arranged in the first to third areas A1 to A3. The third pixel electrodes P3a and P3b extend from the first pixel electrode P1, are divided into third pixel electrodes P3a on one side and third pixel electrodes P3b on the other side with respect to the second pixel electrodes P2a and P2b, are arranged in plural number in the first to third areas A1 to A3, and the slope of the electrodes arranged in the first area A1 and the third area A3 is steeper than the slope of the electrodes arranged in the second area A2 with respect to a virtual horizontal line passing through the central area S. The second pixel electrodes P2a and P2b may be formed such that the electrodes arranged in the second area A2 are divided equally into a second pixel electrode P2a on one side and a second pixel electrode P2b on the other side with respect to the central area S. Then, the third pixel electrodes P3a on one side and the third pixel electrodes P3b on the other side may be spaced apart from each other with respect to the central area S, with the same number of electrodes on each side. Also, the third pixel electrodes P3a and P3b may be formed such that the electrodes disposed at ends of both sides have the greatest thickness.

The first common electrode C1 is disposed on the same layer as the first pixel electrode P1 to the third pixel electrodes P3a and P3b, and arranged in the long-axis direction (y) of the third area A3. The second common electrode C2 extends from the first common electrode C1 in the central area S and is arranged between the second pixel electrodes P2a and P2b. The third common electrodes C3a and C3b extend from the first common electrode C1, are divided into third common electrodes C3a on one side and third common electrodes C3b on the other side with respect to the second pixel electrodes P2a and P2b, are arranged in plural number in the first area A1 to third area A3, and have the same slope as the third pixel electrodes P3a and P3b. The third common electrodes on one side C3a and on the other side C3b are spaced apart from each other with respect to the central area S, with the same number of electrodes on each side. Further, the second common electrode C2 may be formed such that its thickness in the second area A2 is greater than its thickness in the third area A3.

Figure 3:
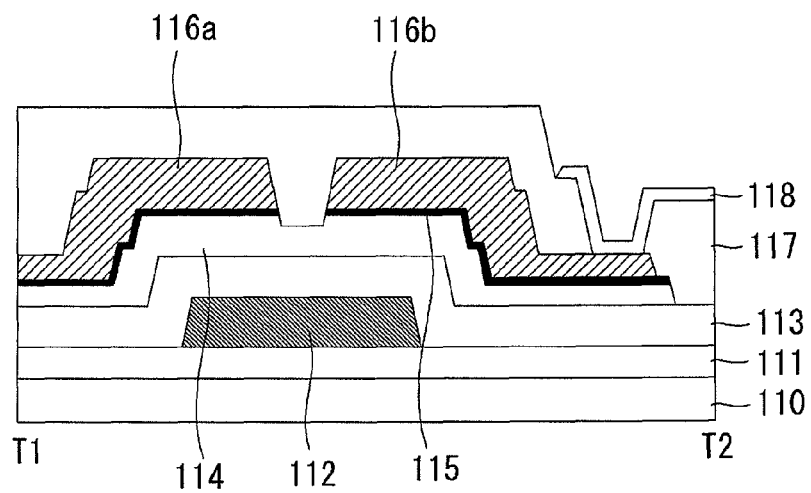
FIG. 3 is a cross-sectional view of areas T1-T2 of FIG. 2.

Referring to FIG. 3, the transistor T may comprise a gate 112, an active layer 114, a source 116a, and a drain 116b. The source 116a or drain 116b is connected to a pixel electrode 118. A structure of the transistor T will now be described in detail.

A buffer layer 111 may be disposed on the first substrate 110. The buffer layer 111 may be formed to protect a transistor to be formed in a subsequent process from impurities such as alkali ions leaking from the first substrate 110. The buffer layer 111 may be made of silicone oxide (SiOx), silicone nitride (SiNx), or the like.

A gate 112 may be disposed on the buffer layer 111. The gate 112 may be connected to the gate line GL. The gate 122 may be formed of any one selected from the group consisting of molybdenum (Mo), aluminum (Al), chromium (Cr), gold (Au), titanium (Ti), nickel (Ni), neodymium (Nd) and copper (Cu), or a combination thereof. Also, the gate 112 may be formed of a multi-layer formed of any one selected from the group consisting of molybdenum (Mo), aluminum (Al), chromium (Cr), gold (Au), titanium (Ti), nickel (Ni), neodymium (Nd) and copper (Cu), or a combination thereof. Also, the gate 112 may be a double layer of molybdenum/aluminum-neodymium or molybdenum/aluminum.

A first insulating film 113 may be disposed on the gate 112. The first insulating film 113 may be a silicon oxide (SiOx) film, a silicon nitride (SiNx) film, or a multi-layer thereof, but is not restricted thereto.

An active layer 114 may be disposed on the first insulating film 113. An ohmic contact layer 115 may be disposed on the active layer 114 in each of source and drain regions. The active layer 114 may be formed of a-Si or p-Si, and the ohmic contact layer 115 may be formed to decrease electrical contact resistance.

A source 116a and a drain 116b may be disposed on the active layer 114 and the ohmic contact layer 115. The source 116a or the drain 116b may be connected to the data line DL. The source 116a and the drain 116b may be formed of a single layer or a multi-layer. If the source 116a and the drain 116b are a single layer, they may be formed of any one selected from the group consisting of molybdenum (Mo), aluminum (Al), chromium (Cr), gold (Au), titanium (Ti), nickel (Ni), neodymium (Nd) and copper (Cu), or a combination thereof. Alternatively, if the source 116a and the drain 116b are a multi-layer, they may be formed of a double layer of molybdenum/aluminum-neodymium or a triple layer of molybdenum/aluminum/molybdenum or molybdenum/aluminum-neodymium/molybdenum.

A second insulating film 117 may be disposed on the source 116a and drain 116b. The second insulating film 117 may be a silicon oxide (SiOx) film, a silicon nitride (SiNx) film, or a multi-layer thereof, but is not restricted thereto.

The source 116a or drain 116b of the transistor T thus formed may be connected to the pixel electrode 118 disposed on the second insulating film 117. The pixel electrode 118 may be formed of any one of ITO (Indium Tin Oxide), IZO (Indium Zinc Oxide), and ZnO (Zinc Oxide), but is not restricted thereto.

Figure 4:
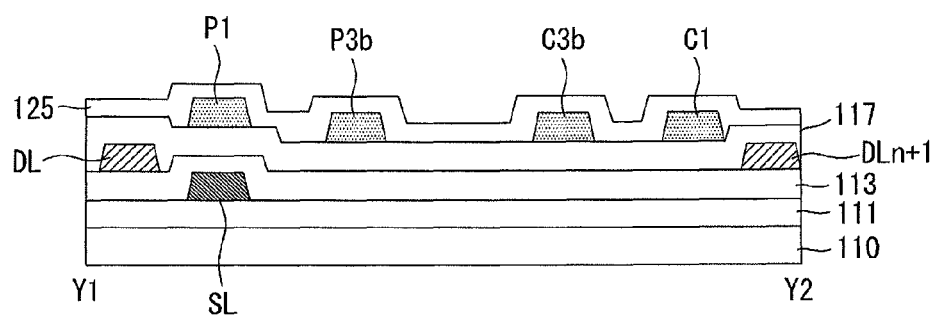
FIG. 4 is a cross-sectional view of areas Y1-Y2 of FIG. 2.

Referring to FIG. 4, the common voltage line SL may be disposed on the buffer layer 111. The first insulating film 113 may be disposed on the common voltage line SL.

A data line DLn+1 connected to a subpixel neighboring the data line DL may be disposed on the common voltage line SL. The second insulating film 117 may be disposed on the data lines DL and DLn+1. The first common electrode P1, the third pixel electrodes P3b on the other side extending from the first pixel electrode P1, the first common electrode C1, and the third common electrodes C3b on the other side extending from the first common electrode C1 may be disposed on the second insulating film 117. Then, an alignment film 125 may be disposed on the first pixel electrode P1, the third pixel electrodes P3b on the other side, the first common electrode C1, and the third common electrodes C3b on the other side.

In the subpixel of the exemplary embodiment, the third pixel electrodes P3a and P3b and the third common electrodes C3a and C3b are formed such that the slope of the electrodes arranged in the first area A1 and the third area A3 is steeper than the slope of the electrodes arranged in the second area A2 with respect to a virtual horizontal line passing through the central area S. Moreover, the third pixel electrodes P3a and P3b and the third common electrodes C3a and C3b may be formed such that the slopes of the electrodes arranged in the first area A1 and the third area A3 are equal.

Figure 5:
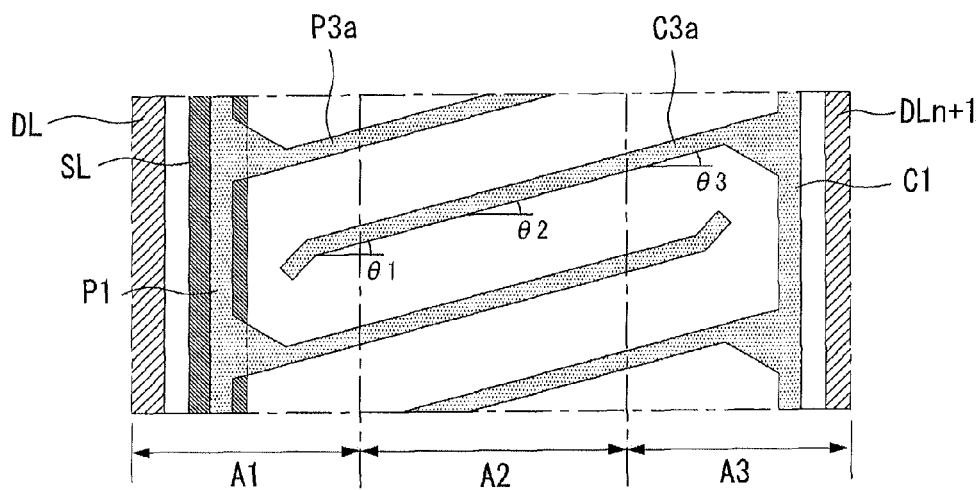
FIG. 5 is a view showing an electrode structure in the related art.
Figure 6:
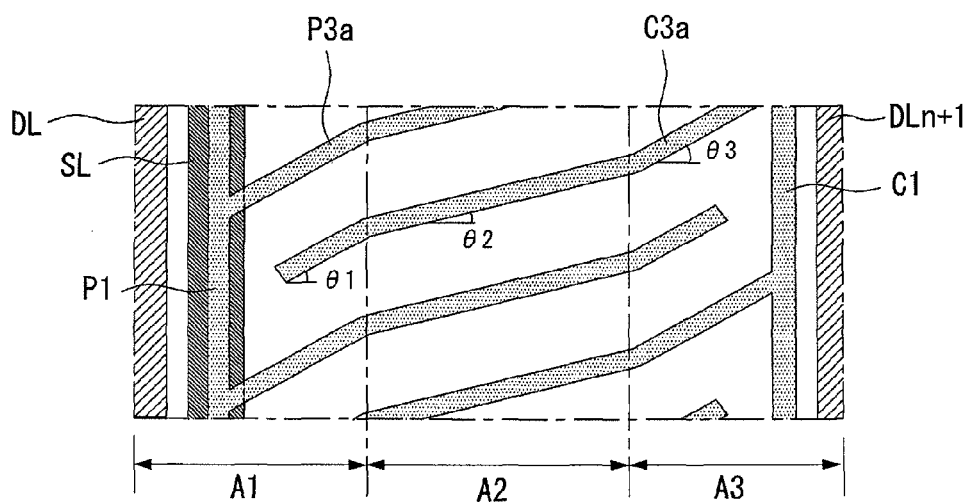
FIG. 6 is a view showing an electrode structure according to an exemplary embodiment.

Referring to FIGS. 5 and 6, an electrode structure in the related art and an electrode structure according to an exemplary embodiment will be described.

In the electrode structure of the related art, slopes θ1, θ2, and θ3 of the third pixel electrodes P3a on one side and the third common electrodes C3a on one side arranged in the first area A1 to third area A3 are all set to be 15°.

On the contrary, in the electrode structure according to an exemplary embodiment, a slope θ2 of the third pixel electrodes P3a on one side and the third common electrodes C3a on one side arranged in the second area A2 is set to be 15°, and slopes θ1 and θ3 of the third pixel electrodes P3a on one side and the third common electrodes C3a on one side arranged in the first area A1 and the third area A3 are set to be steeper than 15°.

In the electrode structure of the related art, the slopes θ1, θ2, and θ3 of the electrodes are all set to be 15°, considering the problem of blurring (or fingerprint smudges) due to disclination caused by external force. However, the external force is applied in different ways according to the areas A1, . . . , A3 defined in the subpixel. As an experimental result, it is shown that parts fragile to external force are the first area A1 and the third area A3 in which the electrodes have multiple slopes.

Meanwhile, in the electrode structure according to the exemplary embodiment, the length of the third pixel electrodes P3a and P3b arranged in the third area A3 and the length of the third common electrodes C3a and C3b arranged in the first area A1 may be set to be about one to two times the distance between the pixel electrodes and the common electrode that are alternately arranged. Here, if the length of the third pixel electrodes P3a and P3b and the third common electrodes C3a and C3b arranged at their respective ends is greater than the above distance, a recovery force acting against the external force can be improved. Further, if the length of the third pixel electrodes P3a and P3b and the third common electrodes C3a and C3b is less than two times the above distance, reduction in transmittance can be prevented, and the electrodes can be formed inclined in the defined subpixel region.

Experimental results show that if the slopes θ1 and θ3 of the third pixel electrodes P3a on one side and the third common electrodes C3a on one side arranged in the first area A1 and the third area A3 are set to be steeper than 15°, liquid crystal molecules can recover even if external force is applied.

The following Table 1 describes the recovery time and recovery state of a liquid crystal cell relative to the slope of the third pixel electrodes P3a and P3b and the third common electrodes C3a and C3b.

TABLE 1

| Slope of Electrodes | Recovery Time | Recovery State |
|---|---|---|
| 10°~15° | — | Poor |
| 20°~29° | Fast | Good |
| 30°~45° | Fast | Very good |

In the experiment of Table 1, the slope of, the third pixel electrodes P3a and P3b and the third common electrodes C3a and C3b arranged in the second area A2 is set to be 15°.

In the experiment of Table 1, if the slope of the third pixel electrodes P3a and P3b and the third common electrodes C3a and C3b arranged in the first area A1 and the third area A3 is set to be 15° or less, it is shown that recovery is not possible and the recovery state is poor.

On the other hand, in the experiment of Table 1, if the slope of the third pixel electrodes P3a and P3b and the third common electrodes C3a and C3b arranged in the first area A1 and the third area A3 ranges from 20° to 29°, it is shown that the recovery time is fast and the recovery state is good. Also, if the slope of the electrodes ranges from 30° to 45°, it is shown that the recovery time is fast and the recovery state is very good.

In the meantime, the recovery time and recovery state of a torque T of liquid crystal molecules in the liquid crystal cell increase in proportion to the slope of the electrodes, as shown in the following Equation 1:

$$|T| = \frac{\partial W_E}{\partial \theta} = \Delta\varepsilon \cdot \sin 2\theta \cdot E^2 \quad \text{[Equation 1]}$$

wherein θ denotes an angle of the electrodes, WE denotes electrical energy in the liquid crystal cell, $\Delta\varepsilon$ denotes a dielectric constant of the liquid crystal cell, and E denotes an electric field between the electrodes.

From the above Equation 1, it can be seen that the torque T of the liquid crystal molecules increases in proportion to the slope θ of the electrodes, and the greater the torque T of the liquid crystal molecules, the greater the recovery force of the liquid crystal arrangement against external force. Therefore, if the slope of the third pixel electrodes P3a and P3b and the third common electrodes C3a and C3b arranged in the first area A1 and the third area A3 is increased, the torque of the liquid crystal molecules is also increased.

Besides, in the above experiment, the torque T of the liquid crystal molecules in the liquid crystal cell is related to the action of external force ef as shown in the following Equation 2:

$$T_{A1,A3(\theta)} > T_{ef} \quad \text{[Equation 2]}$$

Referring to the above Equation 2, it can be seen that, since the torque T of the liquid crystal molecules is proportional to the slope θ of the electrodes, and the greater the torque of the liquid crystal molecules, the greater the recovery force of the liquid crystal arrangement against external force ef, the torque T of the liquid crystal molecules should be larger than a torque caused by external force in order to improve blurring, such as so-called white touch.

Accordingly, if the slope of the third pixel electrodes P3a and P3b and the third common electrodes C3a and C3b arranged in the first area A1 and third area A3 is increased, the torque T of the liquid crystal molecules is also increased, thereby solving the problem of blurring caused by external force ef.

Therefore, if the structure of the third pixel electrodes P3a and P3b and the third common electrodes C3a and C3b included in the subpixel is formed as in the exemplary embodiment, the torque T of the liquid crystal molecules in the liquid discharge cell increases. Hence, even if external force ef is applied to the liquid crystal panel, this generates no disclination caused by dispersion of liquid crystal at the end portions of the electrodes, thus improving the problem of blurring (or fingerprint smudges), such as so-called white touch.

In order to improve the problem of blurring caused by external force, in the above-described exemplary embodiment, the slope of the third pixel electrodes P3a and P3b and the third common electrodes C3a and C3b arranged in the first area A1 and the third area A3 ranges from about 20° to about 45° and the slope of the third pixel electrodes P3a and P3b and the third common electrodes C3a and C3b arranged in the second area A2 is about 15°. However, referring to the experimental results of Table 1 and Equations 1 and 2, even if the electrodes arranged in the second area A2 have a slope different than 15°, the slope of the electrodes in the first area A1 and the third area A3 may be obtained with reference to the slope of the electrodes arranged in the second area A2.

As described above, an exemplary embodiment of the present invention provides a liquid crystal display which is able to solve the problem of blurring (or fingerprint smudges) on subpixels by having an electrode structure capable of preventing disclination caused by dispersion of liquid crystal molecules even if external force is applied to the liquid crystal panel driven in the IPS mode.

The foregoing embodiments and advantages are merely exemplary and are not to be construed as limiting the present invention. The present teachings can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, no such limitation should be interpreted under 35 USC 112 (6).

The invention claimed is:

1. A liquid crystal display comprising a liquid crystal panel including subpixels formed in a matrix, each of the subpixels comprising:
   a first area, a second area, and a third area partitioned off in a first long-axis direction;
   a first pixel electrode arranged in a long-axis direction of the first area;
   a second pixel electrode extending from the first pixel electrode in a central area of the long-axis direction and arranged in the first to third areas, the second pixel electrode including a first portion extending from the first pixel electrode, a second portion extending from the first portion, and a pair of arm portions extending from the second portion, the first and the second portions having a smallest thickness at an interface between the first and second portions;
   third pixel electrodes extending from the first pixel electrode, divided into third pixel electrodes on one side and third pixel electrodes on the other side with respect to the second pixel electrode, arranged in plural number in the first to third areas, a slope of the second and third pixel electrodes arranged in the first and third areas being steeper than the slope of the second and third pixel electrodes arranged in the second area with respect to a virtual horizontal line passing through the central area;

a first common electrode disposed on a same layer as the first to third pixel electrodes and arranged in a first long-axis direction of the third area;

a second common electrode extending from the first common electrode in the central area and arranged between the pair of arm portions of the second pixel electrode; and third common electrodes extending from the first common electrode, divided into third common electrodes on one side and third common electrodes on the other side with respect to the second pixel electrode, arranged in plural number in the first to third areas, and a slope of the third common electrodes arranged in the first and third areas being steeper than a slope of the third common electrodes arranged in the second area with respect to a virtual horizontal line passing through the central area.

2. The liquid crystal display of claim 1, wherein the slopes of the third pixel electrodes and the third common electrodes arranged in the first area and the third area are equal.

3. The liquid crystal display of claim 1, wherein the slope of the third pixel electrodes and the third common electrodes arranged in the first area and the third area ranges from 20° to 45°.

4. The liquid crystal display of claim 1, wherein the slope of the third pixel electrodes and the third common electrodes arranged in the second area is 15°.

5. The liquid crystal display of claim 1, wherein the third pixel electrodes on one side and the third pixel electrodes on the other side are formed such that the electrodes disposed at ends of both sides have the greatest thickness.

6. The liquid crystal display of claim 1, wherein the slope of the second pixel electrode on one side and the second pixel electrode on the other side arranged in the first area and the third area ranges from 20° to 45°, and the slope of the second pixel electrode on one side and the second pixel electrode on the other side arranged in the second area is 15°.

7. The liquid crystal display of claim 1, wherein the liquid crystal panel comprises liquid crystal molecules aligned in an in-plane switching (IPS) mode.

8. A method of manufacturing a liquid crystal display, comprising:

defining a subpixel area as a matrix and defining a first area, a second area, and a third area partitioned off in a first long-axis direction of the subpixel;

forming a first pixel electrode arranged in a long-axis direction of the first area, a second pixel electrode extending from the first pixel electrode in a central area of the long-axis direction and arranged in the first to third areas, and third pixel electrodes extending from the first pixel electrode, divided into third pixel electrodes on one side and third pixel electrodes on the other side with respect to the second pixel electrode, and arranged in plural number in the first to third areas, a slope of the second and third pixel electrodes arranged in the first and third areas being steeper than the slope of the second and third pixel electrodes arranged in the second area with respect to a virtual horizontal line passing through the central area, the second pixel electrode including a first portion extending from the first pixel electrode, a second portion extending from the first portion, and a pair of arm portions extending from the second portion, the first and the second portions having a smallest thickness at an interface between the first and second portions; and forming a first common electrode disposed on a same layer as the first to third pixel electrodes in the central area and arranged in a first long-axis direction of the third area, a second common electrode extending from the first common electrode and arranged between the pair of arm portions of the second pixel electrode, and third common electrodes extending from the first common electrode, divided into third common electrodes on one side and third common electrodes on the other side with respect to the second pixel electrode, arranged in plural number in the first to third areas, and a slope of the third common electrodes arranged in the first and third areas being steeper than a slope of the third common electrodes arranged in the second area with respect to a virtual horizontal line passing through the central area.

9. The method of claim 8, wherein the slopes of the third pixel electrodes and the third common electrodes arranged in the first area and the third area are equal.

10. The method of claim 8, wherein the slope of the third pixel electrodes and the third common electrodes arranged in the first area and the third area ranges from 20° to 45°.

11. The method of claim 8, wherein the slope of the third pixel electrodes and the third common electrodes arranged in the second area is 15°.

12. The method of claim 8, wherein the third pixel electrodes on one side and the third pixel electrodes on the other side are formed such that the electrodes disposed at ends of both sides have the greatest thickness.

13. The method of claim 8, wherein the slope of the second pixel electrode on one side and the second pixel electrode on the other side arranged in the first area and the third area ranges from 20° to 45°, and the slope of the second pixel electrode on one side and the second pixel electrode on the other side arranged in the second area is 15°.

14. The method of claim 8, wherein the liquid crystal panel comprises liquid crystal molecules aligned in an in-plane switching (IPS) mode.

15. The liquid crystal display of claim 1, wherein the first portion has a varied thickness that is reduced from the first pixel electrode toward the second portion to define a triangular shape.

16. The liquid crystal display of claim 1, wherein the second portion has a varied thickness that is increased from the first portion toward the pair of arm portions.

17. The liquid crystal display of claim 1, wherein the third pixel electrodes each define an acute angle relative to the first common electrode except the outermost ones that are farthest from the second pixel electrode.

18. The liquid crystal display of claim 1, wherein the second common electrode includes two sides extending from the first common electrode, each side defining an obtuse angle relative to the first common electrode.

* * * * *